May 10, 1966  H. FELIX  3,250,850
LAMINATED INSULATING BODY
Filed March 15, 1962  4 Sheets-Sheet 1

INVENTOR.
Hans Felix
BY
Michael S. Striker
Attorney

May 10, 1966 H. FELIX 3,250,850
LAMINATED INSULATING BODY
Filed March 15, 1962 4 Sheets-Sheet 2
FIG. 3a
FIG. 3c
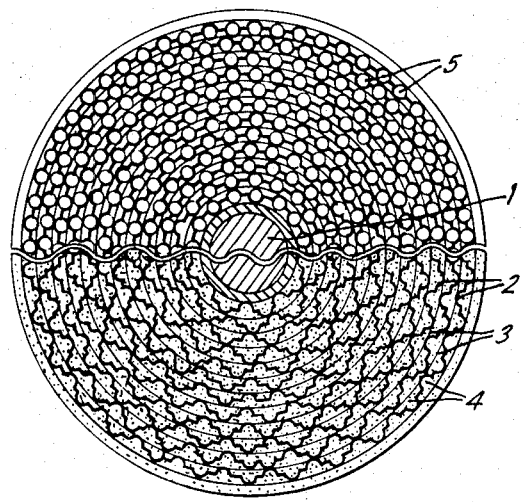
FIG. 3b
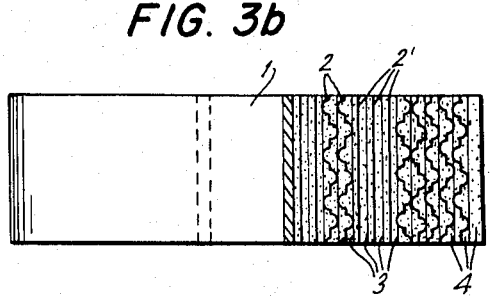
INVENTOR.
Hans Felix
BY
Michael S. Striker
Attorney May 10, 1966 H. FELIX 3,250,850
LAMINATED INSULATING BODY
Filed March 15, 1962 4 Sheets-Sheet 3

INVENTOR.
Hans Felix
BY
Michael S. Striker
Attorney

May 10, 1966 H. FELIX 3,250,850
LAMINATED INSULATING BODY
Filed March 15, 1962 4 Sheets-Sheet 4

INVENTOR.
Hans Felix
BY
Michael S. Striker
ATTORNEY

United States Patent Office 3,250,850
Patented May 10, 1966

3,250,850
LAMINATED INSULATING BODY
Hans Felix, Olten, Switzerland, assignor to Moser-Glaser & Co. AG., Muttenz, near Basel, Switzerland
Filed Mar. 15, 1962, Ser. No. 179,946
Claims priority, application Switzerland, Feb. 17, 1961, 1,977/61; Mar. 16, 1961, 3,160/61
18 Claims. (Cl. 174—121)

The present application is a continuation-in-part of my copending application Serial No. 174,133, entitled "Insulated Electrically Conductive Bodies and Method of Making the Same," filed on or about February 19, 1962, and now abandoned.

The present invention relates to laminated coverings and to a method of making the same, more particularly, the present invention is concerned with insulated electrically conductive bodies such as condenser bushings and other portions of electrical apparatus.

It has been proposed to apply laminated coverings to electrical apparatus by forming a laminated body about such electrical apparatus consisting of smooth papers such as Kraft paper layers which were combined by means of synthetic resins so as to form a laminated body. Condensation resins and solvent-free impregnating and adhesive resins such as epoxy resins and unsaturated polyester or thermoplastic resins, or resins broadly described as casting resins were primarily used for adhering the individual smooth paper layers to each other.

However, it was not possible in this manner to assure the formation of crack-free laminated coverings.

It was also suggested to replace the smooth paper layers with corrugated sheet material. The term "corrugated" will be used throughout the present specification and claims in its broad meaning as defined in the Second Edition of Webster's Unabridged New International Dictionary. However, the intermeshing of adjacent corrugated sheet layers tends to cause difficulties and, furthermore, the fact that corrugated sheets substantially lend themselves to bending only in a direction parallel to that of the corrugations, requires the use of relatively narrow strips of such material when curved pieces of electrical apparatus or other curved solid members are to be provided with such laminated covering.

It is therefore an object of the present invention to provide an improved laminated covering and a method of making the same, the laminated covering to serve as an insulating body.

Other objects and advantages of the present invention will become apparent from a further reading of the description and of the appended claims.

With the above and other objects in view, the present invention contemplates in an electrical apparatus, a laminated body having insulating properties and comprising, in combination, a plurality of superposed first layers of insulating material and second layers alternating with the first layers, the first layers having opposite faces, and being formed respectively, with a plurality of spaced projecting hollow deformations extending outwardly from at least one of the faces toward an adjacent one of the plurality of second layers so as to form a free space between adjacent layers, the projecting hollow deformations of the first layers, respectively, being arranged in such a manner that each of the first layers possesses a reduced resistance to bending in at least one direction, and a cast resin filling the free spaces between adjacent ones of the plurality of superposed layers.

The present invention also proposes in an electrical apparatus, a laminated body having insulating properties and comprising, in combination, a plurality of superposed layers of insulating material having opposite faces, respectively, the layers, respectively, being formed with a plurality of spaced projecting hollow deformations extending outwardly from at least one of the faces toward an adjacent one of the plurality of layers so as to form a free space between adjacent layers, the projecting hollow deformations of the layers, respectively, being arranged in such a manner that each of the layers possesses a reduced resistance to bending in more than one direction, and a cast resin filling the free spaces between adjacent ones of the plurality of superposed insulating layers.

According to one embodiment, the present invention provides in an electrical apparatus, a laminated body having insulating properties and comprising, in combination, a plurality of superposed first layers of elastically tensioned crepe paper, a plurality of second plain sheet layers alternating with the first layers arranged so as to form free spaces between adjacent layers, and a hardened synthetic resin filling the spaces between adjacent layers so as to form a crack-free laminated body.

According to a preferred embodiment, a method of forming a rigid crack-free laminated covering on an elongated substantially cylindrical solid body of predetermined diameter is proposed which comprises the steps of forming a plurality of tubes of pretensioned corrugated sheet material the corrugations of which extend substantially parallel to the axes of the tubes, the tubes being of progressively increasing diameters so that the tubes may be inserted into each other in spaced relationship, the diameter of the smallest tube in tensioned state being sufficient to permit insertion into the same of the substantially cylindrical solid body, forming a plurality of second tubes of plain sheet material of progressively increasing diameters such that the tubes of plain sheet material may be inserted between adjacent ones of the corrugated tubes, assembling the tubes about the cylindrical solid body under tensioning of the first tubes so as to form a composite cylindrical structure formed of the cylindrical solid body surrounded by alternatingly arranged tubular layers of tensioned corrugated and of plain sheet material, impregnating the thus formed composite structure with a synthetic hardenable resin so as to fill all voids therein, and hardening the resin whereby due to the tensioned state of the corrugated tubes the same will be able to conform to any dimensional changes caused by the hardening of the resin, thereby forming a rigid crack-free laminated covering on the elongated solid body.

Thus, the electrical apparatus of the present invention may comprise an elongated solid electrical conductor having a curved axis, and a laminated body having insulating properties at least partially covering the conductor, the laminated body comprising a plurality of superposed first layers of insulating material and second layers alternating with the first layers, respectively, each of the superposed layers being formed of a spirally wound relatively narrow band of sheet material having opposite faces and being arranged substantially coaxially with the solid electrical conductor, the layers being formed with a plurality of spaced projections arranged in two rows extending substantially at right angles to each other, the projections extending outwardly from at least one of the faces toward an adjacent one of the plurality of layers so as to form a free space between adjacent layers, the projections of the layers, respectively, being arranged in such a manner that the layers possess a minimum resistance to bending in more than one direction, and a cast resin filling the free spaces between adjacent ones of the plurality of superposed insulating layers.

The present invention is also concerned with a method of producing an electrical apparatus comprising the steps of arranging about an elongated electrically conductive member coaxially therewith a plurality of superposed first layers of insulating material and second layers alternating with the first layers, the first layers, respectively being formed with a plurality of spaced projections extending toward and contacting adjacent ones of the second layers so as to form a free space between the layers and adjacent the conductive member, filling the free space with a hardenable casting resin in flowable state, and allowing the casting resin filling the space to harden, whereby a unitary, insulated portion of an electrical apparatus is formed.

The carrier layers according to the present invention may be helically wound in the form of relatively narrow bands so as to form concentric layers. In this manner, i.e. by using bands which will form concentric layers with a plurality of spaced projections, the above discussed difficulties will be overcome. It is important that the material of which the layers are to be formed has such projections extending outwardly in at least one direction from the plane of the material, and that the projections are not shaped and arranged that it is possible to bend the material in more than one direction without irreversible deformation of the material of which the insulating layer is formed, will possess a minimum resistance to bending in more than one, i.e., in several directions.

It should be avoided that the projections of adjacent layers interlock. For this reason, as will be described in more detail below, preferably a plain layer, i.e. a layer without projections, is interposed between adjacent layers formed with the above described spaced projections.

The novel features which are considered as characteristic for the invention are set forth in particular in the appended claims. The invention itself, however, both as to its construction and its method of operation, together with additional objects and advantages thereof, will be best understood from the following description of specific embodiments, when read in connection with the accompanying drawings, in which:

FIG. 3 (a–c) illustrates axial and transversal cross sections through an insulated electrically conductive member according to the present invention, partly before and partly after introduction of the casting resin;

Figure 5:
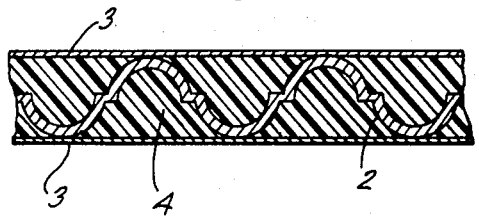
Figure 6:
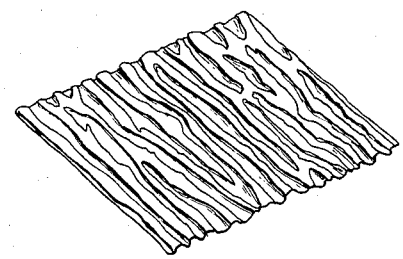
Figure 7:
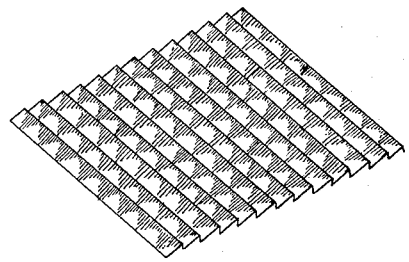
Figure 8:
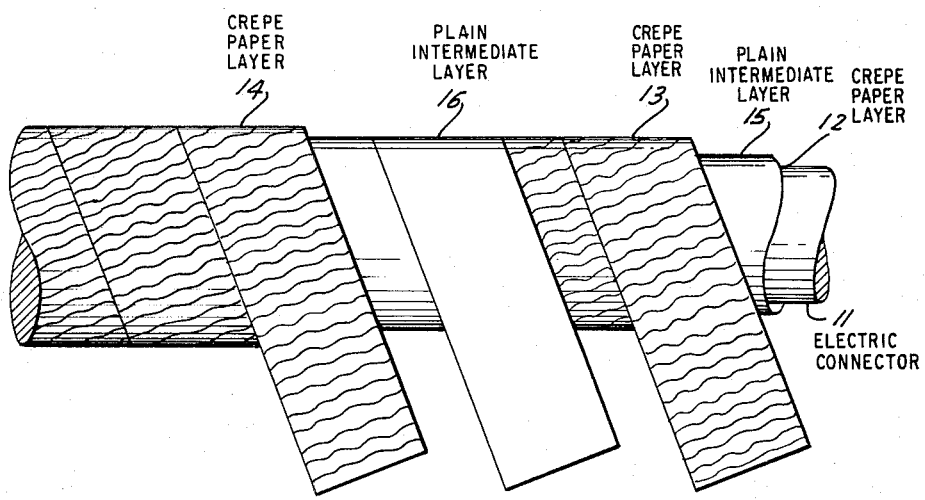

FIG. 5 is an elevational, fragmentary cross sectional view through a portion of the projections carrying layer adhered to adjacent plain layers, and FIGS. 6 and 7 illustrate corrugated papers or sheets which may be used according to the present invention, such as the coarse crepe paper shown in FIG. 6 or the highly tensionable crepe or pleated paper sheet of FIG. 7; and FIG. 8 is a schematic illustration of a manner in which a crack-free laminated covering may be formed on an electrically conductive member.

Figure 1A:
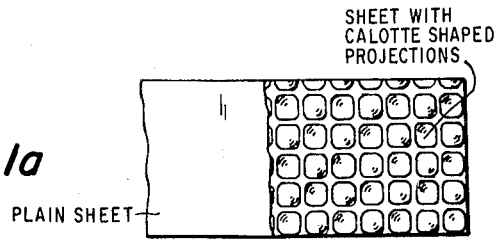
FIG. 1 (a–c) illustrates plan views of fragments of band shaped materials of which the insulating layers according to the present invention may be formed.
Figure 1B:
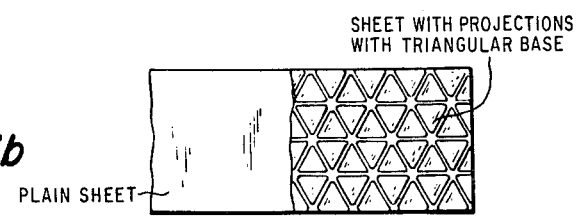
Figure 1C:
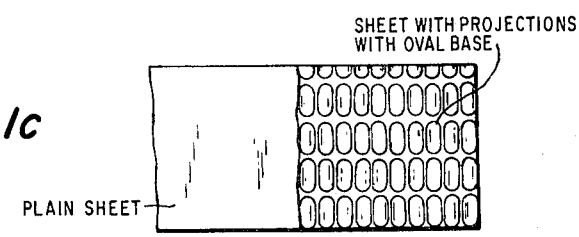

Referring now to the drawings, and particularly to FIG. 1, it will be seen that the projections or "pimples" which preferably are embossed into the carrier layer material, may be of different shape such as calotte-shaped, part-spherical, semi-spherical, triangular, etc. The projections may extend outwardly from one face of the sheet material or alternatingly from one and the other face, so that on each face projections and indentations alternate, as shown in FIGS. 1a, 2, 3a, 3b and 5.

Such embossed sheet material with so-called "Honeycomb embossing" or semi-spherical embossing are produced for instance by the firm Baumgartner in Lausanne, Switzerland. Furthermore, other types of sheet material, produced by the above named firm as decorative paper under the trade names "carbion B" and "carbion C" may also be used for the purposes of the present invention.

As illustrated and stated above, the shape of the projections or "pimples" need not be limited to the shape of a calotte or the like. FIG. 1b shows projections having a triangular base, and it would be also possible to make projections having a square or rhomboid base, usually with more or less rounded corners. Oval or elliptic projections also give good results. Carrier sheets embossed with a combination of differently shaped projections may be used, or carrier sheets which carry a continuous, for instance, zigzag pattern of alternating projections and indentations. However, as has already been stated, it is also possible to use as material for the carrier layer a sheet which has been embossed in such a manner as to have all projections extend outwardly from one face of the sheet.

Figure 2:
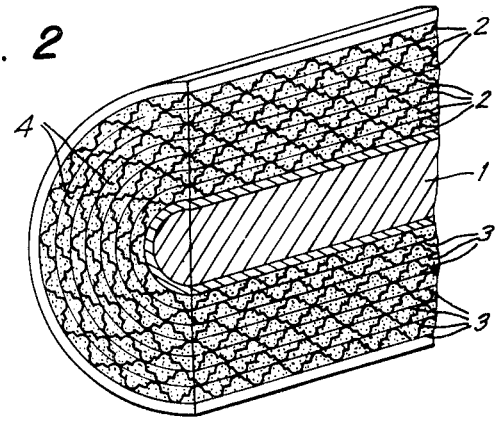
FIG. 2 is a perspective cross sectional view of an insulated electrically conductive member according to the present invention.

Referring now to the perspective cross sectional view of FIG. 2, wherein the left-hand portion of the figure shows a transversal cross section and the right-hand portion of the figure a longitudinal cross section, it will be seen that the high tension conductor 1 is surrounded by several carrier layers 2. The coaxially arranged carrier layers 2 serve as reinforcements of the cast resin and for the spacing of condenser layers 3. As illustrated, the carrier layers are formed with semi-spherical projections which alternatingly extend outwardly from one and the other face of the respective carrier layer. Thus, between the carrier layers a system of free spaces is formed which communicate with each other in axial and tangential direction and which are then filled with a casting resin, preferably with a low casting resin indicated by reference numeral 4.

FIG. 3a is a fragmentary showing in axial direction of the carrier layer skeleton and the condenser layers between the individual carrier layers, prior to introduction of the casting resin. It is shown that the view through the carrier layer skeleton is blocked by the semi-spherical projections which extend transversely throughout the entire carrier layer skeleton. Thus, viewed in axial direction, it would appear as if the skeleton were blocked by spherical or pearl-shaped elements.

The fragmentary cross sectional view of FIG. 3c is taken after introduction and hardening of the casting resin 4. The cross sectional view of FIGS. 3a and 3c are taken in a direction perpendicular to the axis of electric conductor 1, while FIG. 3b is a cross sectional view taken in longitudinal direction of the insulated electric conductor. Here again, reference numeral 1 denotes the electric conductor, reference numeral 4 the casting resin and, depending on whether the cross sectional plane cuts through the projections or between the same, the carrier layers will be seen as indicated by reference numeral 2 or 2'. The condenser layers are again identified by reference numeral 3.

Figure 4:
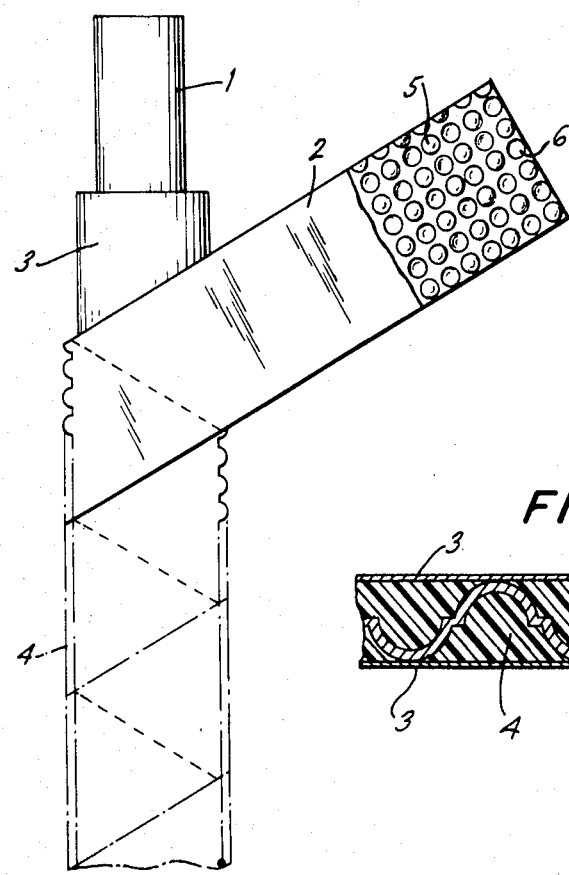
FIG. 4 is a schematic elevational illustration of the winding of the insulating layer about an elongated electrically conductive core member.

According to FIG. 4, the band of projections and indentations 5 and 6 carrying material 2 is helically wound about conductor 1. This is repeated so that several coaxial layers 2 with interposed condenser layer 3 will be superposed upon each other. The last formed layer is indicated by reference numeral 4. The width of band 2 is preferably so chosen that the entire lateral edges of the band are located either between the projections and indentations or cut the same in half.

The casting resin which is used to fill the interspaces between layers 2 and 3 may contain, in a manner known per se, filler materials, particularly pulverulent inert filler materials such as quartz powder or sand.

It is a particular advantage of the present invention that there will be very little separation of the pulverulent filler during hardening of the resin so that in the finished article the pulverulent filler material will be substantially evenly distributed throughout the hardened casting resin.

It is possible and sometimes desirable to insert between the individual layers of projections-carrying sheets plane, i.e. projection-free layers of absorbent or porous material. Or, as illustrated in FIG. 5, a composite structure may be wound about the conductive core, namely a projections carrying layer adhered at both of its faces, i.e. at the apices of the projections, to plain cover layers or sheets. The cover layers as well as the carrier layers 2 may be formed with perforations in order to facilitate passage of flowable casting resin and complete filling of the free spaces within the carrier layer skeleton with the same.

The cover layers may also consist of electrically conductive material, for instance, of metal foil, or stress-grading layers, or condenser layers may be separately arranged between the insulating carrier layers.

Depending on the composition and quality of the carrier layer material, the cover layers may be adhered to the carrier layers in various manners, adhesively or by plastic welding, and such cover layers may be arranged on one or both faces of the respective projections-carrying carrier layer.

Due to the fact that according to the present invention the carrier material may be wound helically in the form of relatively narrow bands to form concentric layers, it is now possible to produce very long or curved condenser bushings. Furthermore, when forming straight condenser bushings, it is no longer necessary to carefully cut rectangular carrier layer sheets to very close tolerances.

Furthermore, the use of a carrier material which is formed at least at one face thereof with spaced relief-like projections, will result in a better statistical distribution, i.e. in a more even distribution of the carrier layer material in the interior of the insulating casting resin body. In addition, the shape and arrangement of the projections will result in a more advantageous distribution of the casting resin relative to the carrier layer skeleton. As compared with prior art structures in which the carrier layer skeleton is formed of corrugated cardboard, insulating bodies produced according to the present invention will be of a more homogenous or isotropic structure. In other words, there will be a more even distribution of carrier layer material, casting resin and filler material within the casting resin throughout the entire structure. For instance, according to the present invention, straight channels of even cross section and similarly shaped casting resin rods filling the same, will be avoided and this will substantially eliminate the danger of transversal crack formation.

The further disadvantage of unhomogenous distribution of mineral fillers such as quartz powder due to gradual separation and settling of the filler during the hardening of the resin, is substantially prevented by forming carrier layers as described herein. Experiments have shown that such carrier materials according to the present invention, i.e. the configuration of the spaces which are then filled with casting resin, will have a retarding effect on the separation and settling of the filler material. Thus, according to the present invention, it is possible to introduce highly fluid casting resins and the greater the fluidity of the casting resin the bigger and longer may be the insulating bodies formed in this manner. Up to now, it was very difficult to operate with highly fluid casting resins due to the settling of pulverulent filler materials therein. This difficulty is overcome to a very large extent by the present invention and thus it is possible with the carrier skeleton arrangement disclosed herein to produce larger insulating bodies with filler material-containing casting resins.

Preferably, the embossed carrier layers according to the present invention are produced from an absorbent porous sheet material such as a fibrous sheet material, particularly cellulose fibers containing material, a paper or paper-like products.

The projections which are arranged on at least one face of the carrier layer are so arranged that the layer material possesses very little resistance to bending in more than one direction. For instance, inspection of FIG. 1a will show that there will be little resistance to bending in horizontal direction and in direction perpendicular and diagonal thereto. Thus, winding of the material about a core can be carried out without mechanical destruction thereof, i.e. without tearing of the embossed sheet material or band and without subjecting the same to undue mechanical stresses.

Due to the extension of the projections perpendicular to the plane of the sheet, the maximum transverse or perpendicular dimension of the embossed sheet will be a multiple of the thickness of the initial sheet.

The following examples are given as illustrative only without limiting the invention to the specific data of the examples.

EXAMPLE 1

Straight cylindrical condenser bushing

Six layers of a carrier material such as is illustrated in FIG. 1a are arranged on a straight copper rod of circular cross section having a diameter of 30 mm. and a length of 1400 mm. The total thickness of the six layers equals 18 mm. Between adjacent layers a perforated electrically conductive insert of Höchstätter paper, i.e. a paper supported aluminum foil, is arranged. The length of the conductive insert is reduced in radial direction as it is customary in the case of condenser bushings. The carrier layer supporting the respective conductive insert exceeds the length of the conductive insert by about 5 mm. on each side.

The carrier material is cut into strips having a width of 80 mm. and is wound about the conductive copper rod in helical manner so that the edges of adjacent windings contact each other.

The conductive inserts are placed coaxially onto the underlying wound carrier layer in the form of rectangular sheets, and are fixed to the carrier layer with adhesive tape. After forming the first layer in the above described manner, five additional layers are similarly superposed. Left-hand and right-hand windings will alternate between adjacent superposed layers.

The copper rod with the carrier layers and conductive inserts fixed thereto is then inserted coaxially into a casting mold of 84 mm. inner diameter. The mold is closed at its lower end and provided with a feeding funnel at its upper end. The mold is installed in upright position in a heatable vacuum chamber and the contents of the mold are dried and degassed for four hours at a pressure of 0.5 mm.

Thereafter, while the vacuum is maintained, the casting resin is introduced through the funnel at a temperature of 80° C. After 10 minutes, the vacuum is released and the resin is then hardened for 12 hours at 90° C. and thereafter for 8 hours at 120° C. After cooling, the thus formed body is removed from the mold and a terminal is affixed to the outermost stress grading layer for later grounding.

The materials used in the present example are, for the carrier layer, an embossed, machine-smooth cellulose paper having a structure as illustrated in FIG. 1a, a total thickness of 3 mm. and an unembossed sheet thickness of 0.5 mm. The weight of the unembossed paper equals 375 grams per square meter.

The casting resin mixture consists of 100 parts by weight of epoxy resin on the basis of p,p-dioxydiphenyl-propane, having an epoxy equivalence weight of between 185 and 200, and a viscosity of between 11,000 and 14,000 centipoises at 25° C.; 130 parts by weight of dodecenylsuccinic acid anhydried; 0.2 part by weight of methylbenzyldimethyl-amine; and 300 parts by weight of quartz powder (325 mesh per inch—according to Tyler).

Resin and acid anhydride are mixed well and then dried. The quartz powder is added and as last component the methylbenzyldimethylamine. The components were then intimately mixed for 10 minutes.

EXAMPLE 2

Curved condenser bushing

Six coaxial layers of the carrier and spacing material are formed about a circular copper rod of 22 mm. diameter and 1600 mm. length, which rod had been bent at its center to an angle of 60°, with a radius of 500 mm. Between the individual carrier layers step-graded electrically conductive inserts are arranged. The carrier material is helically wound in the form of bands having a width of 60 mm. about the straight portions of the copper rod, while the windings about the curved portion of the copper rod are formed of bands having a width of 15 mm. The windings about the curved portion of the copper rod are so formed that the bent edges at the inner curvature of the rod contact each other while there will be a free space of a few millimeters between adjacent band edges at the outer curvature of the rod. About each thus formed carrier layer, a smooth paper band of 15 mm. width is helically wound, and coated for the desired distance with a graphite lacquer. Then follows the next layer of carrier material and thereon the next helically wound layer of partially graphite lacquered smooth paper. The total thickness of the six layers equals 19 mm.

The thus covered copper rod is installed in a metal mold of 67 mm. inner diameter in such a manner that the distance between the covered rod and the inner mold wall remains even throughout. The lower end of the mold is closed and a funnel is arranged at its upper end. The mold is installed in as upright position as possible in a vacuum oven, dried and degased for 5 hours at 80° C. and 0.5 mm. Hg. Thereafter, the casting mixture is introduced through the funnel at a temperature of 80° C. while vacuum is maintained. After 15 minutes atmospheric pressure is restored and the resin is hardened for 12 hours at 90° C. and thereafter for 8 hours at 120° C.

The bands of carrier material consist of embosed cellulose paper as illustrated in FIG. 1a, having a total thickness of 2.8 mm., and an unembossed thickness of 0.25 mm. The paper weight equals 200 grams per square meter.

The smooth paper which carries the graphite lacquer is a kraft paper having a thickness of 0.15 mm. and a weight of 113 grams per square meter. The composition of the casting mixture is the same as in Example 1.

EXAMPLE 3

Cylindrical straight condenser bushing

The arrangement, dimensions and the quality of the carrier material are the same as in Example 1. However, the casting mixture consists of 100 parts by weight of Rhodester 1108 R a solution of an unsaturated polyester in styrene made by the firm Rhone-Poulenc, Paris, France and having a viscosity of 300 centipoises at 25° C.; one part by weight benzoyl peroxide; and 150 parts by weight quartz powder (325 mesh per inch).

Resin hardener and well dried filler are intimately mixed and cast at 40° C.

Hardening is carried out for 8 hours at 80° C. and for 12 hours at 120° C.

When corrugated sheet material such as crepe paper or the like is to be used, preferably in pretensioned state, to form part of the laminated covering, it has been found, according to the present invention, that superior results are achieved when intermeshing or interlocking of adjacent crepe paper layers is avoided, so that the pretensioned individual crepe paper layers may expand or contract without interference from adjacent crepe paper layers. The pretensioned crepe paper or the like layer preferably is in a condition wherein further tensioning would lead to further expansion and, on the other hand, reduction in the applied tension would lead to contraction of the layer. This is important in order to permit the corrugated, pretensioned layer to adjust to dimensional changes occurring during hardening of the hardenable or casting resin used for impregnating the composite layer structure. Such resin, F.1, may contract somewhat during hardening thereof. For this purpose, according to the present invention, smooth or plain sheet layers are interposed between adjacent corrugated sheet layers.

By proceeding in this manner, namely so that the individual pretensioned crepe paper layers may contract or expand, independent of and without interference by adjacent superposed crepe paper layers, it is possible to substantially eliminate any differences which may exist in the degree of pretensioning of the crepe paper layers. In other words, by proceeding as outlined above, the degree of pretensioning of all of the superposed crepe paper layers can be equalized.

When it is intended to build up the laminated body of tubular crepe paper or the like layers alternating with plain tubular sheet layers, then the fact that the individual tubular crepe paper layers are movable relative to the adjacent plain sheet layers, will permit to give to each of the tubular crepe paper layers a desired degree of pretensioning, which will be equal throughout the entire respective tubular crepe paper layer. This ability of the corrugated or crepe paper layers to contract or expand so as to adjust to any dimensional changes of the synthetic resin which may occur during hardening of the latter, will facilitate the formation of crack-free laminated bodies. It is well known and need not be discussed in detail herein that the absence of cracks or voids in insulating bodies covering portions of electrical apparatus, such as condenser bushings, is a very important requirement.

Thus, according to the present invention, it is proposed to interpose intermediate layers of smooth, plain, foil-type sheet material between adjacent superposed, preferably pretensioned, layers of corrugated sheet material such as crepe paper. The characteristics and thickness of the interposed plain foils or sheets will be so chosen that the plain layers are capable of carrying the superposed layers substantially without being deformed so that expansion and contraction of adjacent corrugated layers will not be interfered with by the adjacent or contacting plain layer, for instance, when the layers are superposed upon each other in the manner illustrated in FIG. 8.

To proceed in this manner, i.e., by preventing the crests of the corrugations of one layer to extend in the valleys between the crests of corrugations of an adjacent layer, in other words, by preventing intermeshing of adjacent corrugated layers, will not only achieve that the finished laminated body will be crack-free, but other advantages are also connected therewith. Thus, the layer structure, according to the present invention, i.e., without intermeshing of adjacent layers, will be less dense than a structure consisting of superposed intermeshing corrugated layers.

Consequently wider spaces will be formed between adjacent layers and this will permit the use of more viscous impregnating resins for filling the spaces between adjacent layers. When using crepe-type papers of relatively coarse structure or corrugation, it is possible and frequently advantageous to incorporate mineral fillers in pulverulent form, such as quartz powder, in the hardenable synthetic impregnating resin. This can be done successfully only if the width of the voids or free spaces between adjacent superposed layers is relatively great. It could be said that, according to the present invention, the crepe or the like layers serve primarily as resilient spacing and supporting elements for the plain, preferably smooth and frequently conductive layers which are interposed between adjacent crepe layers. Thus, the crepe layers serve to form a reinforcing skeleton surrounded by free spaces which are relatively large so as to facilitate filling of these free spaces with the hardenable resin. The thus-formed laminated body consists of a relatively small proportion of layer material and a relatively large proportion of hardened resin.

The foregoing is particularly important when a laminated body is desired primarily consisting of a hardened insulating resin having a plurality of conductive, for instance metal, layers distributed therethrough. In such case the main purpose of the corrugated layers is to space the plain conductive layers from each other until after the impregnating resin has been applied and hardened. The plain conductive layers should not conform to the corrugations of the interposed layers of crepe paper or the like, but are only supported by the same.

For instance, in the case of condenser bushings, i.e. when it is desired to provide an insulating covering for high voltage carrying conductive members of electrical apparatus and when it is further desired to incorporate conductive layers in the insulating covering, then these conductive layers are advantageously utilized as the plain layers which are interposed between adjacent corrugated layers, and the strength and surface condition of the conductive layers will be so chosen as not to interfere with contraction or expansion of adjacent corrugated layers. For this purpose the interposed conductive layers preferably will have smooth surfaces and will be of even thickness throughout, sufficient to prevent deformation of the conductive layer when arranged between corrugated or crepe paper layers. Thereby also the dielectric properties of the structure are improved since irregularities in the distribution of the electric field would occur if the metallic or the like conductive layers were permitted to hug the corrugations of the insulating layers. By thus preventing irregularities in the distribution of the electric field, localized electric over-stresses within the individual layers are avoided.

The conductive inserts or layers may consist, for instance, of aluminum foils, aluminum foils backed by a paper layer, fine-mesh metal wire fabric, graphite paper, metallized paper or foils. Preferably, the edge portions of such conductive layers or inserts are provided with so-called "potential rings" in order to reduce the electric stress at the edges of the insert. In this manner, the occurrence of a high electric field strength at the edges of such stress-grading layers is prevented. Aluminum foils used as plain layers interposed between crepe paper layers may be relatively thin, for instance having a thickness of 0.01 mm. If such metal foils are too thin to withstand deformation when in contact with the adjacent corrugated layers, then a paper backing or the like should be attached to the metal foil.

Potential rings may consist, for instance, of endless metal coil springs of small coil diameter; or resilient rings with rounded edges and a conductive surface may be used, such as heat resistant conductive rubber rings which, per se, are well known. The potential rings are then conductively connected with the conductive plain layers, for instance, by welding, soldering, or adhesively with an electrically conductive lacquer. Very good results are obtained wtih plain conductive stress-grading layers of fine metal mesh and coil springs as described above serving as potential rings.

Highly advantageous results are obtained by using as corrugated layers crepe paper which is crimped in such a manner that the possible tensioning due to crimping or creping amounts to between 10 and 50% or even more of the original length of the crepe paper. However, it is also possible to use crepe papers which can be stretched to a lesser extent.

Laminated bodies of the above described type may be formed of crepe paper webs, alternating with plain webs, which are of considerable width, or also of narrower crepe paper bands. Thus, the respective layers may be formed by winding strips of the layer material about the conductive member, or also by using suitably cut sheets of the layer material.

As hardenable synthetic resins primarily those are to be considered, according to the present invention, which are free of solvents and which harden ineversibly without splitting off volatile constituents.

Particularly, so-called low pressure resins such as epoxy-resins and the resins which belong to the group of unsaturated polyesters have been found to give good results, according to the present invention. The use of these latter resins is connected with the great advantage, particularly in the case of high voltage installations, which must be free of pores or blisters, that the laminated body can be produced without application of pressure and—when cold hardening resins are applied—the hardening can be carried out without appreciable supply of heat.

Furthermore, poly-condensation resins, preferably phenol-formaldehyde and cresol-formaldehyde resins which can be solidified by hardening and which can be applied in a manner known per se, can be used. When it is desired to produce pore-free coverings with these latter resins, then they must be worked up under application of pressure and heat and thereby slightly prehardened resins are preferred.

Furthermore, unsaturated simple polymerizable so-called monomeric or oligomeric substances may be used, such as styrene or metacrylic acid esters which are transformed into solid state by polymerization.

In addition, thermoplastic materials may be used as hardenable synthetic resins, according to the present invention, provided that the thermoplastic materials will become solidified by being cooled to the operating temperature of the laminated body, i.e. to the highest temperature to which the laminated body might be exposed after installation. Such thermoplastic materials can be used which are of sufficiently liquid consistency at temperatures which are still too low to adversely affect the crimping of the crepe paper.

The following example of hardenable resins which may be used, according to the present invention, is given as illustrative only, the invention, however, not being limited to the specific resins mentioned therein.

EXAMPLE

Epoxy resins which may be used, according to the present invention, are for instance mixtures of materials containing poly-epoxide with a 1,2-epoxy equivalent greater than one, produced for instance from polyhydric phenols or polyhydric alcohols and halohydrins (excluding fluorine compounds) and a hardener.

As starting materials for preparing poly-epoxides may be used, for instance:

*Polyhydric phenols.*—Resorcinol, hydroquinone, pyrocatechol, saligenin, phloroglicinol, 4,4′ dihydroxy-diphenyl-dimethyl-methane, 4,4′ dihydroxy-biphenyl, 4,4′ dihydroxy-diphenyl-sulfone, 4,4′ dihydroxy-diphenyl-methane, trihydroxy - diphenyl - dimethyl - methane, polyhydric naphthalenes, novolac resins.

*Polyhydric alcohols.*—Glycerol, ethylene glycol, 2,3-butanediol, erythanol, sorbitol, trimethyleneglycol, diglycerol.

*Halohydrine.*—Epichlorhydrin, dichlorhydrin, epibromhydrin, epihalohydrins of mannitol, sorbitol, erythrol. The preparation of such poly-epoxides is, for instance, described in the following U.S. patents: 2,324,483; 2,444,333; 2,467,171; 2,538,072; 2,558,949; 2,582,985; 2,592,560; 2,665,266; 2,521,911; and in the following British patents: 746,824; 726,830.

The poly-epoxides may also be formed of compounds containing double bonds, such as: esters of oleic and linolic acid with glycerine, crosslinked polybutadiene rubber (which contains terminal and internal olefin groups) epoxidized with peracetic acid.

The preparation of these compounds is, for instance, described in Fitzgerald et al., "Epoxy-Polybutadiene Resins," Electronic Equipment, July 1956, and in U.S. patents: 2,485,160; 2,569,502; 2,458,484; 2,567,930.

These products are, for instance, available under the following trade names: Epon-Resin of Shell Chemical Co.; Epi-Rez of John Dabney Co.; Araldite of CIBA Co., Inc.; Bakelite ERL-2774, EBL-3794, ERL-2795.

The above described poly-epoxides can be transformed into hard thermoset solids by the following methods:

(1) By direct linkage between epoxy groups and hydroxyl groups with catalysts such as tertiary amines and Friedel-Crafts type catalysts; for instance as described in U.S. patents: 2,553,718; 2,575,558.

(2) By curing with crosslinking agents:

(a) *Primary and secondary aminos.*—Ethylene diamine, diethylene triamine, triethylene tetramine, dimethylamino propylamino, piperidine, metaphenylene diamino, 4,4′ methylene dianiline, diaminodiphenylsulfone;

(b) *Amides.*—Dicyandiamide, polyamide;

(c) *Organic acids.*—Oxalic acid, phthalic anhydride, citraconic anhydride, maleic anhydride, hexahydrophthalic anhydride, pyromellitic dianhydride, dodecenyl succinic anhydride, methylated maleic acid adduct of phthalic anhydride, chlorendic anhydride, maleic acid adduct of phthalic anhydride. Such resin-hardener systems are, for instance, described in the following U.S. patents: 2,324,483; 2,444,333; 2,500,600; 2,585,115; 2,717,885; 2,744,845; 2,760,944; 2,773,048.

Basic condensation products may also be considered as poly-epoxy bodies for the purposes of the present invention.

To the above described mixtures, plastifiers, wetting agents, etc. can be added. The preparation, use and adjustment of such epoxy-resins has been described in Henry Lee's "Epoxy-Resins," published by McGraw-Hill Book Company, Inc., 1957.

Unsaturated polyester-type resins are, for instance, described in the following publications: C. P. Vale: "The Chemistry of Unsaturated Polyester Resins," "British Plastics," September 1953, pp. 327–332, U.S. Patent 2,604,463.

They are formed by copolymerization of unsaturated polyesters, from glycols and unsaturated dibasic acids, with vinyl type monomers such as styrene, diallylphthalate, triallylcyanurate, etc., in the presence of a catalyst such as benzoyl peroxide, methyl-ethyl-ketone peroxide, cyclohexanone peroxide, etc.

While the laminations, according to the present invention, may be formed in many different ways, it is particularly advantageous to form the same by winding the plain and crepe paper webs or bands about a conductor or the like, or about a temporary mandrel. Thereby care has to be taken to wind as tightly as possible. Furthermore, the crepe paper should not be tensioned too strongly during the winding so that under all circumstances the wound crepe paper retains at least part of its crimping. Thereby, those crepe paper types which, due to their crimping, can be stretched by more than 50% of their original length can be tensioned more strongly than crepe paper types of lesser crimping. Furthermore, the crepe paper is to have such mechanical strength as to allow the forming of a dense roll without excessive stretching of the paper.

When it is desired to provide laminated coverings for straight members such as cylindrical members or rods, or also on multi-edged profiles, it is frequently advantageous to use, according to the present invention, plain and crepe paper webs having a width corresponding to the width of the body which is to be covered.

It is important, of course, that the individual corrugated layers and plain layers are so superposed upon each other that independent expansion and contraction of the individual corrugated layers or portions thereof remains possible. Thus, when a cylindrical conductive member is to be provided with a laminated covering, individual tubular layers of corrugated sheet material and of plain sheet or foil material having progressively increasing diameters may be prepared and may then be sequentially slipped over the cylindrical conductor and the previously applied layers. Here again, the individual corrugated tubular layers preferably will be pretensioned. Some or all of the plain layers may consist completely or partially of conductive material so as to form stress-grading layers. The supporting plain layers must not be adhesively or otherwise adhered to the adjacent corrugated layers such as crepe paper layers, since such adherence would prevent the independent expansion or contraction of the corrugated layer which should be possible in order to equalize the degree of pretensioning of the corrugated layer and in order to permit adjustment of the corrugated layer to any dimensional changes occurring in the impregnating resin during hardening of the same.

When it is desired to form a crack-free laminated covering on a very long body or on a body having a curved axis, then preferably relatively small bands are helically wound about such body, for instance a high voltage conductor, so as to form alternating coaxial corrugated and plain layers. In the case of curved conductors, the bands may be so cut, considering the pitch of the helical winding, the radius of the curvature of the conductor and the diameter of the same, that overlapping of band portions is avoided.

The corrugated layers, particularly if the same are of a coarse structure so that the thickness measured between the crests of opposite corrugations equals 2 mm. or more, as well as the interposed plain layers may be formed with perforations or cutouts therein which will permit passage of impregnating resin in radial direction therethrough.

Referring now again to the drawings, and particularly to FIG. 6, the same shows a portion of a sheet of such corrugated or crepe paper of coarse structure.

FIG. 7 illustrates a crepe-type or pleated paper which may be stretched to a very high degree and which possesses a much more even and symmetric structure than the sheet of FIG. 6. This type of paper, particularly with respect to resilient tensioning thereof, shows a behavior which is somewhat similar to that of conventional crepe paper and thus permits application while being in partially pretensioned state, namely so that the creping or pleating is partially retained when the sheet or band is wound about the conductor or the underlying plain layer. This type of pleated paper is commercially available, for instance, under the trade name "Carbion" from the firm Baumgartner of Lausanne, Switzerland.

According to FIG. 8, crepe paper bands, or bands of other types of preferably pretensioned corrugated material are wound about an electric conductor 11. Thereby, on top of each completed wound layer of crepe paper such as layers 12, 13 and 14, a plain supporting intermediate layer, such as layers 15 and 16, is wound followed by another crepe paper layer. Layers 15 and 16 may be conductive layers, consisting for instance of metal foil, or layers 15 and 16 may be plain paper layers which also may serve as support for a further (not illustrated) intermediate electrically conductive layer.

The intermediate plain layers may be superposed upon the underlying layer of crepe paper or the like in the form of a wide web such as layer 15, or the intermediate layer may be formed by helically winding a relatively narrow band 16.

The skeleton of the laminated covering which is formed according to FIG. 8 about a straight cylindrical conductor, may also be arranged about a curved conductor, in which case the layers preferably are formed by helical winding of relatively narrow bands. However, when a corrugated paper of relatively coarse structure is to be wound, then such band is preferably pre-cut so as to avoid overlapping at the inner periphery of the curved conductor.

Particularly good results are obtained when as synthetic resin for impregnating the skeleton structure of alternating corrugated and plain layers, a hardenable casting resin such as an epoxy resin or an unsaturated polyester resin is used in which preferably a pulverulent filler material such as quartz powder has been incorporated.

In addition to the above described corrugated papers, it is sometimes also desirable to use embossed papers or embossed crepe papers which possess the added advantage of forming in superposed relationship larger free spaces, corresponding to the embossing of the paper, whereby the use of more viscous resins or pulverulent filler-containing resins is facilitated. Embossed crepe papers suitable for this purpose are commercially available, for instance, as "Perlkrepp-Papers."

The plain intermediate layers may also be formed wholly or in part of such material that they will not only carry or support the superposed corrugated layer without being deformed but in addition will reinforce and give additional mechanical strength to the entire laminated structure. Thus, the plain layer may consist of various types of fabrics, such as glass fiber fabrics or fabrics of synthetic materials, fleeces, or foils. Such reinforcing intermediate plain layers may also consist of composite sheets, the reinforcing fabric, for instance, forming a backing for a metal foil adhered thereto.

The last described embodiments of the present invention will be further illustrated in the following examples without limiting the invention to the specific details of the examples.

EXAMPLE 4

A laminated insulating covering is to be formed about a cylindrical copper rod having a straight axis, a diameter at 30 mm. and a length of 1500 mm., for instance, a condenser bushing. The laminated covering is to include five layers of a crepe paper or pleated paper such as is illustrated in FIG. 7. Between adjacent crepe paper layers a plain, smooth conductive layer is to be arranged. The length of the superposed conductive layers is reduced in the direction from the innermost to the outermost layer, as is customarily the case in condenser bushings. The crepe paper layers extend laterally at both sides respectively about 5 mm. beyond the next superposed conductive layer.

The crepe paper, in creped condition, weighs 330 grams per square meter, has an extensibility of 300% and a thickness in creped condition of 3.8 mm., while the thickness of the same but uncreped paper equals 0.2 mm.

The crepe paper is cut into rectangular pieces, the length of which exceeds the length of the sheets of the conductive layer material by 10 mm. The width is equal to ⅔ of the calculated circumference of the respective tubular layer which is to be formed of the sheet, plus 5 mm., so that the sheet will be stretched when wound about the copper rod. The thus-cut pieces of crepe paper are formed into tubes with the corrugations extending coaxially with the thus-formed tubes to allow upon stretching to increase the tube diameter, The width of the sheet will now form the circumference of the tube, however, 5 mm. of the width are arranged overlapping each other so that for 2½ mm. of the circumference and extending longitudinally there will be an intermeshing of the superposed end portions of the cut, now tubular sheet.

The thus-formed tubes are coaxially superposed upon each other and upon the copper rod. A tubular sheet of smooth graphited Kraft paper having a thickness of 0.15 mm. and weighing 113 grams per square meter is arranged between each pair of adjacent tubular crepe paper layers so that contact between adjacent crepe paper layers is prevented. During superposing of the individual crepe paper layers the same are stretched by about 50%. The total wall thickness of the composite structure comprising 5 tubular crepe paper layers and 4 interposed conductive layers equals about 19.5 mm.

The thus-covered conductor is now placed into a cylindrical mold having an inner diameter of 75 mm. and fixed therein coaxially with the mold. The mold has a closed bottom and a funnel for introducing resin at its upper end.

The mold holding the conductor with the crepe paper and conductive layers about the same, is now placed into a heatable vacuum container and is therein dried and degassed for 6 hours at a temperature of 80° C. and at a residual pressure of 0.5 mm. Hg. Thereafter, the casting resin is introduced through the funnel into the mold while vacuum and a temperature of 80° C. are maintained as before. Thirty minutes after introduction of the resin atmospheric pressure is restored, and the resin is allowed to harden for 12 hours at 90° C. and thereafter for 8 hours at 120° C. Thereafter the mold and its contents are allowed to cool to ambient temperature and then the thus-formed insulated condenser bushing is removed from the mold. A ground connection will be eventually attached to the outermost conductive layer.

The casting resin mixture is formed of 100 parts by weight of epoxy resin on the basis of p,p'-dioxydiphenylpropane having an epoxy equivalent weight of between 185 and 200 and a viscosity of between 11,000 and 14,000 centipoises at 25° C.; plus 130 parts by weight of dodecenylsuccinic acid anhydride; plus 0.2 part by weight of methylbenyldimethylamine; plus 350 parts by weight of quartz powder of 325 mesh per inch (according to Tyler).

EXAMPLE 5

A straight cylindrical copper rod of 40 mm. diameter and 1000 mm. length is surrounded, as described in Example 4, with alternating tubular crepe paper layers and tubular plain sheet layers, the crepe paper layers initially serving as support and spacing elements.

The crepe paper, in creped condition, has a weight of 250 grams per square meter, is capable of being stretched by 30%, has a thickness of 0.8 mm. in creped condition, while the thickness of the sheet prior to creping equals 0.2 mm.

The crepe paper is cut into bands of 30 mm. width and helically wound about the copper conductor. During such winding, the crepe paper is stretched by 7%. After forming in this manner a first layer of crepe paper on the copper conductor, a single sheet of smooth Kraft paper having a thickness of 0.15 mm. and a weight of 113 grams per square meter is wound about it. The rectangular sheet of kraft paper has been cut to the length and circumference of the conductor with the first crepe paper layer thereon, so that the sheet covers the entire free surface of the first crepe paper layer. Thereafter, the next crepe paper layer is wound about the last formed layer of kraft paper, and this is followed by helically winding a band of 15 mm. width of "cable paper" for a desired length about the previously formed layer. The cable paper consists of a paper backing having a thickness of 0.15 mm. and having adhered thereto an aluminum foil of 0.008 mm. thickness. Foil and backing paper are formed with perforations of 1 mm. diameter. The length for which this conductive layer covers the copper rod depends on the desired distribution of the electric field.

Further layers are applied until a total of 18 crepe paper with interposed kraft paper layers with 9 interposed conductive layers surround the copper rod.

The thus-covered conductor is then installed in a cylindrical mold, dried and heated and then impregnated with a resin mixture, as described in Example 4. The resin mixture has the following composition: 100 parts by weight epoxy resin as described in Example 4; plus 130 parts by weight of dodecenylsuccinic acid anhydride; plus 0.2 part by weight of methylbenzyldimethylamine; plus 100 parts by weight of ground dolomite having a particle size of 20 microns.

EXAMPLE 6

A copper rod of 30 mm. diameter and a total length of 1600 mm. is bent in its middle portion to an angle of 45° with a radius of 600 mm. Strips of creped paper such as described in Example 4 with the corrugations thereof extending in transverse direction and having a width of 40 mm. are helically wound about the copper rod so that in the straight portion of the rod the edges of adjacent windings contact each other. In the bent portion, the crepe paper band is so cut as to prevent substantial overlapping of adjacent windings along the inner periphery of the copper rod. During the winding of the crepe paper the same is stretched by 50% of its original length. Upon each thus-formed layer of crepe paper, a layer of cable paper of the type described in Example 5 is wound in the form of a band of 15 mm. widths. Again, the portion of the length of the copper rod along which the conductive layers are formed depends on the desired distribution of the electric field.

A total of 4 crepe paper layers with respectively superposed conductive layers are wound about the copper rod and the length of the individual crepe paper layers is adjusted corresponding to that of the adjacent conductive layers. The rod with the layers wound about the same is now installed in a curved mold of 70 mm. inner diameter coaxially therewith i.e. in such a manner that its distance from the inner mold wall will be the same throughout. The mold is closed at its lower end and provided with a funnel at its upper end. The mold is then installed in as upright a position as possible in a heatable vacuum container, dried and degassed for 12 hours at 40° C. under a residual pressure of 0.5 mm. Hg. Thereafter, the resin mixture is allowed to flow into the mold at a temperature of 40° C. while vacuum is maintained. Thirty minutes after introduction of the resin atmospheric pressure is restored and the resin is then allowed to harden first for 8 hours at 80° C. and then for 12 hours at 120° C.

The resin mixture consists of 100 parts by weight of Rhodester 1108 R a solution of an unsaturated polyester in styrene made by the firm Rhone-Poulenc of Paris, France, and having a viscosity of 300 centipoises at 25° C.; plus 1 part by weight of benzoylperoxide; plus 150 parts by weight of quartz powder, 325 mesh.

It will be understood that each of the elements described above, or two or more together, may also find a useful application in other types of "laminated coverings" differing from the types described above.

While the invention has been illustrated and described as embodied in an insulated electrically conductive body, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical apparatus, in combination, a solid electrical conductor; and a laminated body having insulating properties at least partially covering said conductor, said laminated body comprising a plurality of superposed layers of insulating material having opposite faces and being arranged substantially coaxially with said solid electrical conductor, said layers, respectively, being formed with a plurality of spaced projecting hollow deformations extending outwardly from at least one of said faces toward an adjacent one of said plurality of layers with outermost portions of said projecting deformations contacting said adjacent layer so as to form voids between adjacent layers, said spaced projecting hollow deformations of said layers, respectively, being arranged in such a manner that each of said layers possesses a reduced resistance to bending in more than one direction and said superposed layers being arranged without intermeshing between the same, and a cast resin filling said voids between adjacent ones of said plurality of superposed insulating layers.

2. In an electrical apparatus, in combination, a solid electrical conductor; and a laminated body having insulating properties at least partially covering said conductor, said laminated body comprising a plurality of superposed layers of insulating material having opposite faces and being arranged substantially coaxially with said solid electrical conductor, said layers, respectively, being formed with a plurality of spaced hollow calotte-shaped projections extending outwardly from at least one of said faces toward an adjacent one of said plurality of layers with outermost portions of said projecting deformations contacting said adjacent layer so as to form voids between adjacent layers, said calotte-shaped projections of said layers, respectively, being arranged in such a manner that each of said layers possesses a reduced resistance to bending in more than one direction and said superposed layers being arranged without intermeshing between the same, and a cast resin filling said voids between adjacent ones of said plurality of superposed insulating layers.

3. In an electrical apparatus, in combination, a solid electrical conductor; and a laminated body having insulating properties at least partially covering said conductor, said laminated body comprising a plurality of superposed first layers of insulating material and of second plain sheet layers alternating with said first layers without adhering to the latter, said first layers, respectively, having opposite faces and being arranged substantially coaxially with said solid electrical conductor, said first layers, respectively, being formed with a plurality of spaced hollow projections extending outwardly from at least one of said faces toward an adjacent one of said plurality of second layers so as to form a free space between adjacent layers, said projections of said first layers, respectively, being arranged in such a manner that each of said first layers possesses a minimum resistance to bending in more than one direction, and a cast resin filling said free spaces between adjacent ones of said plurality of superposed layers.

4. In an electrical apparatus, in combination, a solid electrical conductor; and a laminated body having insulating properties at least partially covering said conductor, said laminated body comprising a plurality of superposed first layers of insulating material and second layers alternating with said first layers, said first layers without adhering to the latter, respectively, having opposite faces and being arranged substantially coaxially with said solid electrical conductor, only said first layers being formed, respectively, with a plurality of spaced hollow projections arranged in two rows extending substantially at right angles to each other, said hollow projections extending outwardly from at least one of said faces toward an adjacent one of said plurality of second layers so as to form a free space between adjacent layers, said projections of said first layers, respectively, being arranged in such a manner that each of said layers possesses a reduced resistance to bending in more than one direction, and a cast resin filling said free spaces between adjacent ones of said plurality of superposed layers.

5. In an electrical apparatus, in combination, a solid electrical conductor; and a laminated body having insulating properties at least partially covering said conductor, said laminated body comprising a plurality of superposed layers of insulating material having opposite faces and being arranged substantially coaxially with said solid electrical conductor, said layers, respectively, being formed with a plurality of spaced hollow part-spherical projections extending outwardly from at least one of said faces toward an adjacent one of said plurality of layers with outermost portions of said projecting deformations contacting said adjacent layer, so as to form voids between adjacent layers, said part-spherical projections of said layers, respectively, being arranged in such a manner that each of said layers possesses a reduced resistance to bending in more than one direction and said superposed layers being arranged without intermeshing between the same, and a cast resin filling said voids between adjacent ones of said plurality of superposed insulating layers.

6. In an electrical apparatus, in combination, a solid electrical conductor; and a laminated body having insulating properties at least partially covering said conductor, said laminated body comprising a plurality of superposed first layers of insulating material and second layers of absorbent sheet material alternating with said first layers without adhering to the latter, said first layers respectively, having opposite faces and being arranged substantially coaxially with said solid electrical conductor, said layers, respectively, being formed with a plurality of spaced hollow projections extending outwardly from at least one of said faces toward an adjacent one of said plurality of second layers with outermost portions of said projecting deformations contacting said adjacent layer so as to form voids between adjacent layers, said projections of said first layers, respectively, being arranged in such a manner that each of said first layers possesses a reduced resistance to bending in more than one direction, and a cast resin filling said voids between adjacent ones of said plurality of superposed layers.

7. In an electrical apparatus, in combination, a solid electrical conductor; and a laminated body having insulating properties at least partially covering said conductor, said laminated body comprising a plurality of superposed first layers of insulating material and second sheet layers formed at least partly of electrically conductive material and alternating with said first layers without adhering to the latter, said first layers, respectively, having opposite faces and being arranged substantially coaxially with said solid electrical conductor, said first layers, respectively, being formed with a plurality of spaced hollow projections extending outwardly from at least one of said faces toward an adjacent one of said plurality of second layers with outermost portions of said projecting deformations contacting said adjacent layer so as to form voids between adjacent layers, said projections of said first layers, respectively, being arranged in such a manner that each of said first layers possesses a minimum resistance to bending in more than one direction, said second layers being formed at least partially of conductive material, and a cast resin filling said voids between adjacent ones of said plurality of superposed layers.

8. In an electrical apparatus, in combination, a solid electrical conductor; and a laminated body having insulating properties at least partially covering said conductor, said laminated body comprising a plurality of superposed layers of insulating material having opposite faces and being arranged substantially coaxially with said solid electrical conductor, said layers, respectively, being formed with a plurality of spaced hollow projections extending outwardly from at least one of said faces toward an adjacent one of said plurality of layers with outermost portions of said projecting deformations contacting said adjacent layer so as to form voids between adjacent layers, said spaced hollow projections of said layers, respectively, being arranged in such a manner that each of said layers possesses a reduced resistance to bending in more than one direction and said superposed layers being arranged without intermeshing between the same, and a cast resin having pulverulent, inorganic filler material distributed therethrough filling said voids between adjacent ones of said plurality of superposed insulating layers.

9. In an electrical apparatus, in combination, a solid electrical conductor; and a laminated body having insulating properties at least partially covering said conductor, said laminated body comprising a plurality of superposed first layers of insulating material and second sheet layers formed of perforated sheet material alternating with said first layers without adhering to the latter, said first layers, respectively, having opposite faces and being arranged substantially coaxially with said solid electrical conductor, said first layers, respectively, being formed with a plurality of spaced hollow projections extending outwardly from at least one of said faces toward and adjacent one of said plurality of second layers so as to form a free space between adjacent layers, said projections of said first layers, respectively, being arranged in such a manner that each of said first layers possesses a reduced resistance to bending in more than one direction, and a cast resin filling said free spaces between adjacent ones of said plurality of superposed layers.

10. An electrical apparatus as defined in claim 1 wherein each of said plurality of superposed layers consists of a spirally wound relatively narrow band of sheet material.

11. In an electrical apparatus, in combination, an elongated solid electrical conductor having a curved axis; and a laminated body having insulating properties at least partially covering said conductor, said laminated body comprising a plurality of superposed first layers of insulating material and second layers alternating with said first layers without adhering to the latter, each of at least said first layers being formed of a spirally wound relatively narrow band of sheet material having opposite faces and being arranged substantially coaxially with said solid electrical conductor, said first layers, respectively, being formed with a plurality of spaced hollow projections extending outwardly from at least one of said faces toward an adjacent one of said plurality of second layers with outermost portions of said projecting deformations contacting said adjacent layer so as to form voids between adjacent layers, said projections of said first layers, respectively being arranged in such a manner that each of first layers possesses a minimum resistance to bending in more than one direction, and a cast resin filling said voids between adjacent ones of said plurality of superposed insulating layers.

12. In an electrical apparatus, a laminated body having insulating properties and comprising, in combination, a plurality of superposed first layers of elastically tensioned crepe paper; a plurality of second plain sheet layers alternating with said first layers without adhering to the latter and arranged so as to form free spaces between adjacent layers; and a hardened synthetic resin filling said spaces between adjacent layers so as to form a crack-free laminated body.

13. In an electrical apparatus, a tubular laminated body having insulating properties and comprising, in combination, a plurality of superposed tubular first layers of elastically tensioned crepe paper; a plurality of tubular second plain sheet layers alternating with said first layers without adhering to the latter and arranged so as to form free spaces between adjacent tubular layers; and a hardened synthetic resin filling said spaces between adjacent layers so as to form a crack-free tubular laminated body.

14. In an electrical apparatus, in combination, a solid electrical conductor; and a rigid, crack-free laminated body having insulating properties at least partially covering said conductor, said laminated body comprising a plurality of tubular first layers of elastically tensioned crepe paper superposed upon each other, and a plurality of supporting second tubular sheet layers alternating with said first tubular layers without adhering to the latter, said crepe paper being formed with a plurality of spaced projecting hollow deformations extending outwardly and contacting an adjacent one of said second tubular layers so as to form channel-shaped free spaces between adjacent tubular layers; and a hardened synthetic resin filling all voids between said pluralities of layers so as to form with said layers a crack-free tubular laminated body.

15. In an electrical apparatus, in combination, a solid electrical conductor; and a rigid, crack-free laminated body having insulating properties at least partially covering said conductor, said laminated body comprising a plurality of tubular first layers of elastically tensioned crepe paper superposed upon each other, and a plurality of second tubular layers formed of electrically conductive foil material alternating with said first tubular layers without adhering to the latter so as to form free spaces between adjacent tubular layers; and a hardened synthetic resin filling all voids between said pluralities of layers so as to form with said layers a crack-free tubular laminated body.

16. In an electrical apparatus, in combination, a solid electrical conductor; and a rigid, crack-free laminated body having insulating properties at least partially covering said conductor, said laminated body comprising a plurality of tubular first layers of elastically tensioned crepe paper superposed upon each other, and a plurality of second tubular composite sheet layers including an electrically conductive foil material, alternating with said first tubular layers without adhering to the latter so as to form free spaces between adjacent tubular layers; and a hardened synthetic resin filling all voids between said pluralities of layers so as to form with said layers a crack-free tubular laminated body.

17. In an electrical apparatus, in combination, a solid electrical conductor; and a rigid, crack-free laminated body having insulating properties at least partially covering said conductor, said laminated body comprising a plurality of tubular first layers of elastically tensioned crepe paper superposed upon each other, and a plurality of second tubular layers including a metal foil alternating with said first tubular layers without adhering to the latter so as to form free spaces between adjacent tubular layers; and a hardened synthetic resin filling all voids between said pluralities of layers so as to form with said layers a crack-free tubular laminated body.

18. In an electrical apparatus, in combination, a solid electrical conductor; and a rigid, crack-free laminated body having insulating properties at least partially covering said conductor, said laminated body comprising a plurality of tubular first layers of elastically tensioned crepe paper superposed upon each other, and a plurality of second tubular layers formed of perforated sheet material alternating with said first tubular layers without adhering to the latter so as to form free spaces between adjacent tubular layers; and a hardened synthetic resin filling all voids between said pluralities of layers so as to form with said layers a crack-free tubular laminated body.

References Cited by the Examiner

UNITED STATES PATENTS

| | | | |
|---|---|---|---|
| 2,103,841 | 12/1937 | Calvert | 156—53 |
| 2,106,850 | 2/1938 | McCulloch | 156—53 |
| 2,502,113 | 3/1950 | Walker | 161—131 X |
| 2,607,823 | 8/1952 | Camilli et al. | 174—124 |
| 2,607,824 | 8/1952 | Camilli et al. | 174—124 |
| 2,622,051 | 12/1952 | Hermanson et al. | 161—131 X |
| 3,112,357 | 11/1963 | Imhof | 174—124 X |

FOREIGN PATENTS

| | | |
|---|---|---|
| 76,022 | 4/1919 | Austria. |
| 98,626 | 11/1924 | Austria. |

OTHER REFERENCES

Raupach: 1,089,828, Sept. 29, 1960, German printed application.

"Casting Resins Are Here To Stay as a Method of Housing Components," Electronics, October 1956, pp. 191.

ROBERT K. SCHAEFER, *Primary Examiner.*

JOHN P. WILDMAN, LARAMIE E. ASKIN, JOHN F. BURNS, *Examiners.*

W. F. ZAGURSKI, D. A. KETTLESTRINGS,
*Assistant Examiners.*